United States Patent
Wundsam et al.

(10) Patent No.: US 10,419,421 B2
(45) Date of Patent: Sep. 17, 2019

(54) SYSTEMS AND METHODS TO SECURELY CONSTRUCT A NETWORK FABRIC

(71) Applicant: Big Switch Networks, Inc., Santa Clara, CA (US)

(72) Inventors: Andreas Wundsam, Mountain View, CA (US); Gregor Maier, Alameda, CA (US); Carl D. Roth, Santa Cruz, CA (US); Jeffrey Townsend, Morgan Hill, CA (US); Jason Parraga, Sunnyvale, CA (US); Cham Ho Li, San Jose, CA (US); Tomasz Klimczyk, Lgota Wielka (PL)

(73) Assignee: Big Switch Networks, Inc., Santa Clara, CA (US)

( * ) Notice: Subject to any disclaimer, the term of this patent is extended or adjusted under 35 U.S.C. 154(b) by 410 days.

(21) Appl. No.: 15/234,757

(22) Filed: Aug. 11, 2016

(65) Prior Publication Data

US 2018/0048639 A1 Feb. 15, 2018

(51) Int. Cl.
*H04L 29/06* (2006.01)
*G06F 9/4401* (2018.01)
(Continued)

(52) U.S. Cl.
CPC ........ *H04L 63/0823* (2013.01); *G06F 9/4401* (2013.01); *G06F 13/4022* (2013.01);
(Continued)

(58) Field of Classification Search
None
See application file for complete search history.

(56) References Cited

U.S. PATENT DOCUMENTS 8,392,712 B1 * 3/2013 Wilson .................... H04L 63/08
713/175
8,494,485 B1 7/2013 Broch
(Continued)

FOREIGN PATENT DOCUMENTS

WO 2018031740 2/2018

OTHER PUBLICATIONS

"International Application Serial No. PCT/US2017/046239, International Search Report dated Oct. 18, 2017", 4 pgs.
(Continued)

*Primary Examiner* — Lynn D Feild
*Assistant Examiner* — Vadim Savenkov
(74) *Attorney, Agent, or Firm* — Schwegman Lundberg & Woessner, P.A.

(57) ABSTRACT

Methods, systems, and computer programs are presented for creating a secure network fabric and for adding trusted devices to an existing secure network fabric. One method includes an operation for setting a switch into a provisioning mode where the switch does not enforce secure communications. While the switch is in provisioning mode, the method performs operations including establishing a connection from the switch to a provisioning controller, sending a certificate signing request (CSR) from the switch to the provisioning controller, and receiving, from the provisioning controller, a security certificate generated by a certificate authority. The method further includes an operation for entering a lockdown mode by the switch after receiving the security certificate, where the switch, while in lockdown mode, secures communications utilizing the security certificate.

20 Claims, 11 Drawing Sheets

(51) Int. Cl.
*G06F 13/40* (2006.01)
*H04L 12/24* (2006.01)
(52) U.S. Cl.
CPC .......... *H04L 41/0806* (2013.01); *H04L 41/28* (2013.01); *H04L 63/105* (2013.01)

(56) References Cited

U.S. PATENT DOCUMENTS

| | | | | |
|---|---|---|---|---|
| 8,799,648 | B1* | 8/2014 | Singh | H04L 63/0823 |
| | | | | 370/310 |
| 9,455,958 | B1* | 9/2016 | Walter | H04L 63/08 |
| 9,621,540 | B2* | 4/2017 | Almahallawy | H04L 63/062 |
| 2010/0037293 | A1* | 2/2010 | StJohns | H04L 63/20 |
| | | | | 726/2 |
| 2014/0032897 | A1* | 1/2014 | Datta | H04L 63/0823 |
| | | | | 713/151 |
| 2014/0181504 | A1* | 6/2014 | Almahallawy | H04L 63/062 |
| | | | | 713/156 |
| 2014/0282922 | A1* | 9/2014 | Iwanski | H04L 63/0428 |
| | | | | 726/5 |
| 2015/0052351 | A1 | 2/2015 | Fard et al. | |
| 2016/0044000 | A1* | 2/2016 | Cunningham | H04L 9/14 |
| | | | | 713/175 |
| 2017/0005808 | A1* | 1/2017 | Gunti | H04L 9/321 |
| 2017/0053258 | A1* | 2/2017 | Carney | G06Q 20/223 |
| 2017/0339144 | A1* | 11/2017 | Han | H04L 63/0876 |
| 2018/0083830 | A1* | 3/2018 | Pendleton | H04L 67/20 |
| 2018/0262350 | A1* | 9/2018 | Wei | H04L 9/321 |

OTHER PUBLICATIONS

"International Application Serial No. PCT/US2017/046239, Written Opinion dated Oct. 18, 2017", 5 pgs.

"International Application Serial No. PCT/US2017/046239, International Preliminary Report on Patentability dated Dec. 6, 2018", 16 pgs.

* cited by examiner

SYSTEMS AND METHODS TO SECURELY CONSTRUCT A NETWORK FABRIC

TECHNICAL FIELD

The subject matter disclosed herein generally relates to methods, systems, and programs for securely constructing a network fabric, and more particularly, methods, systems, and computer programs for creating a secure network fabric and for adding trusted devices to an existing secure network fabric.

BACKGROUND

Oftentimes, network management involves controlling a plurality of network devices (e.g., switches, routers) to make sure that the network operates properly and efficiently. A control plane is a mechanism for managing the network devices by exchanging safe communications among the plurality of network devices that form the control plane.

A network attack may involve intruding into the control plane to have a malicious network device control how packets are directed through the network. For example, a malicious attacker could re-route network traffic to a phishing server.

In order to avoid intrusions into the control plane, network devices have to be secured, such as by enforcing encrypted communications. However, setting up new devices for security often requires manual work by the network administrator to install security certificates by hand on the network device. In addition, if the network administrator makes a mistake installing security certificates, the whole network may be compromised.

It is in this context that embodiments arise.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
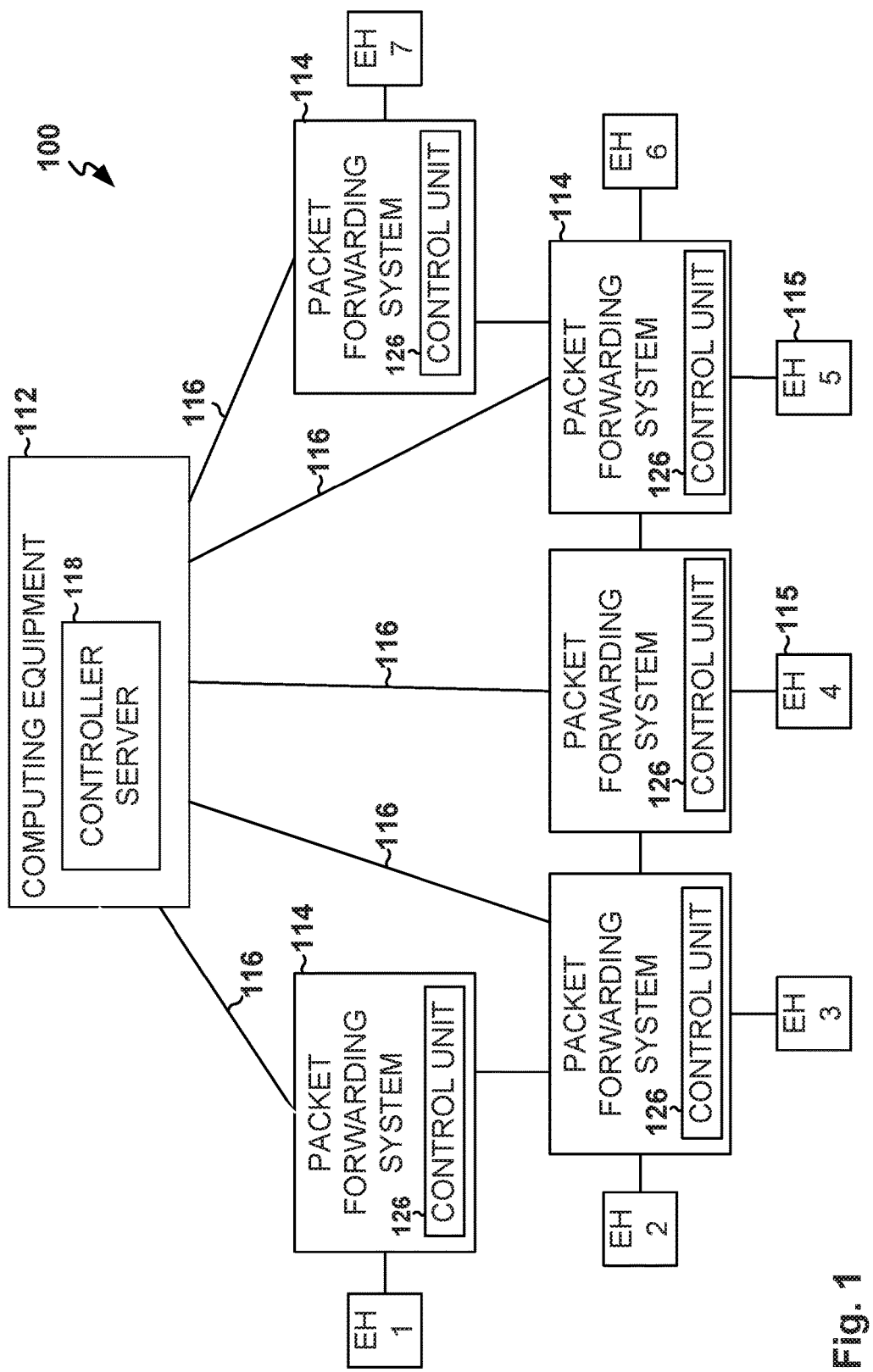
FIG. 1 is a block diagram illustrating a multi-vendor network architecture, according to an example embodiment.

Example methods, systems, and computer programs are presented for creating a secure network fabric and for adding trusted devices to an existing secure network fabric. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

To establish trust in a network device, an administrator often has to attach a computing device, such as a laptop, to the network device and then configure the device, including adding certificates. The network administrator may have to communicate with another computing device acting as a certificate authority (CA) to get the certificate. For example, the administrator may install the certificate in portable memory and then plug the portable memory into the network device or the laptop. This has to be repeated for all network devices. Once the trust is established, the network system is able to differentiate between a device that has been validated and a malicious device trying to infiltrate the network.

In some example embodiments, the process to secure a network device is simplified by implementing two different states of operations of the network devices: a provisioning mode and a lockdown mode. In the provisioning mode, trust is assumed and security is not enforced. In the lockdown mode, security is strictly enforced to protect the network from attacks.

The benefit of this approach is that the administrator does not have to "touch" all these devices to configure them. To configure a new network device, the new network device is connected to a trusted network and booted up, and the security configuration process is mostly automatic, no need to manually configure the device.

In one general aspect, a method includes an operation for receiving a request to set a switch into a provisioning mode where the switch does not enforce secure communications. While the switch is in provisioning mode, the method performs operations including establishing a connection from the switch to a provisioning controller, sending a certificate signing request (CSR) from the switch to the provisioning controller, and receiving, from the provisioning controller, a security certificate generated by a certificate authority. The method further includes an operation for entering a lockdown mode by the switch after receiving the security certificate, where the switch while in lockdown mode secures communications utilizing the security certificate. In some example embodiments, the operations of the method are executed by a processor.

In another general aspect, a switch includes packet processing circuitry for switching packets, a memory including instructions, and one or more computer processors. The instructions, when executed by the one or more computer processors, cause the one or more computer processors to perform operations including receiving a request to set the switch into a provisioning mode where the switch does not enforce secure communications. While the switch is in provisioning mode, the one or more computer processors perform operations including establishing a connection from the switch to a provisioning controller, sending a certificate signing request (CSR) from the switch to the provisioning controller, and receiving, from the provisioning controller, a security certificate generated by a certificate authority. The one or more computer processors further perform an operation for entering a lockdown mode by the switch after receiving the security certificate, where the switch while in lockdown mode secures communications utilizing the security certificate.

In one general aspect, a non-transitory machine-readable medium includes a set of instructions that, when executed by a machine, causes the machine to perform a set of operations including receiving a request to set a switch into a provisioning mode where the switch does not enforce secure communications. While the switch is in provisioning mode, the machine performs operations including establishing a connection from the switch to a provisioning controller, sending a certificate signing request (CSR) from the switch to the provisioning controller, and receiving, from the provisioning controller, a security certificate generated by a certificate authority. The machine further performs an operation for entering a lockdown mode by the switch after receiving the security certificate, where the switch while in lockdown mode secures communications utilizing the security certificate.

FIG. 1 is a block diagram illustrating a network architecture, according to an example embodiment. The network architecture is illustrated by a network 100 that provides for centralized control and that includes computing equipment 112, such as controller server 118, also referred to herein as controller; one or more end hosts 115; and one or more packet forwarding systems 114, which are also referred to as switches, network switches, or packet processing systems. The controller server 118 is communicatively coupled via network links 116 to control units 126 in the packet forwarding systems 114 to implement a network configuration and to perform other types of centralized control. The packet forwarding systems 114 include input-output ports utilized to communicatively couple the packet forwarding systems 114 to other packet forwarding systems 114 or to controller server 118. The packet forwarding systems 114 further include additional input-output ports utilized to communicatively couple the packet forwarding systems 114 to end hosts (EH) 115 (e.g., EH1, EH2, EH3, etc.). The end hosts 115 communicate, via the packet forwarding systems 114, with each other or with other computing devices connected to network 100 via one or more routers (not shown).

Multi-vendor networks such as network 100, the Internet, and the local and regional networks coupled to the Internet, rely on the packet forwarding systems 114, that are packet-based. These packet forwarding systems 114 can forward packets based on embedded address information. Packet sources and destinations may include end hosts 115 (e.g., EH1, EH2, EH3, etc.). Examples of end hosts 115 are personal computers, servers, and other computing equipment such as portable electronic devices that access the network 100 using wired or wireless technologies.

Network switches (e.g., packet forwarding system 114) in multi-vendor networks range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet-forwarding network, but can be difficult to manage in a centralized fashion due to incompatibilities between different operating systems and control protocols.

These potential incompatibilities can be overcome by incorporating a common cross-platform control unit 126, also referred to herein as a controller client or control module, into each packet forwarding system 114. A centralized cross-platform controller, such as a controller server 118, may interact with each of the control units 126 over respective network links 116. The use of a cross-platform controller server 118 and control units 126 allows potentially disparate network equipment to be centrally managed.

In a typical network environment, one or more controller servers interface with one or more network switches to manage network traffic. For example, an active controller server may be managing the network traffic while a standby controller server is in place, just in case the active controller server becomes inoperative. The infrastructure involving the management of a plurality of network devices is referred to as the control plane. Securing the control plane is critical in a network to avoid malicious users from interfering with the normal flow of network traffic.

Figure 2:
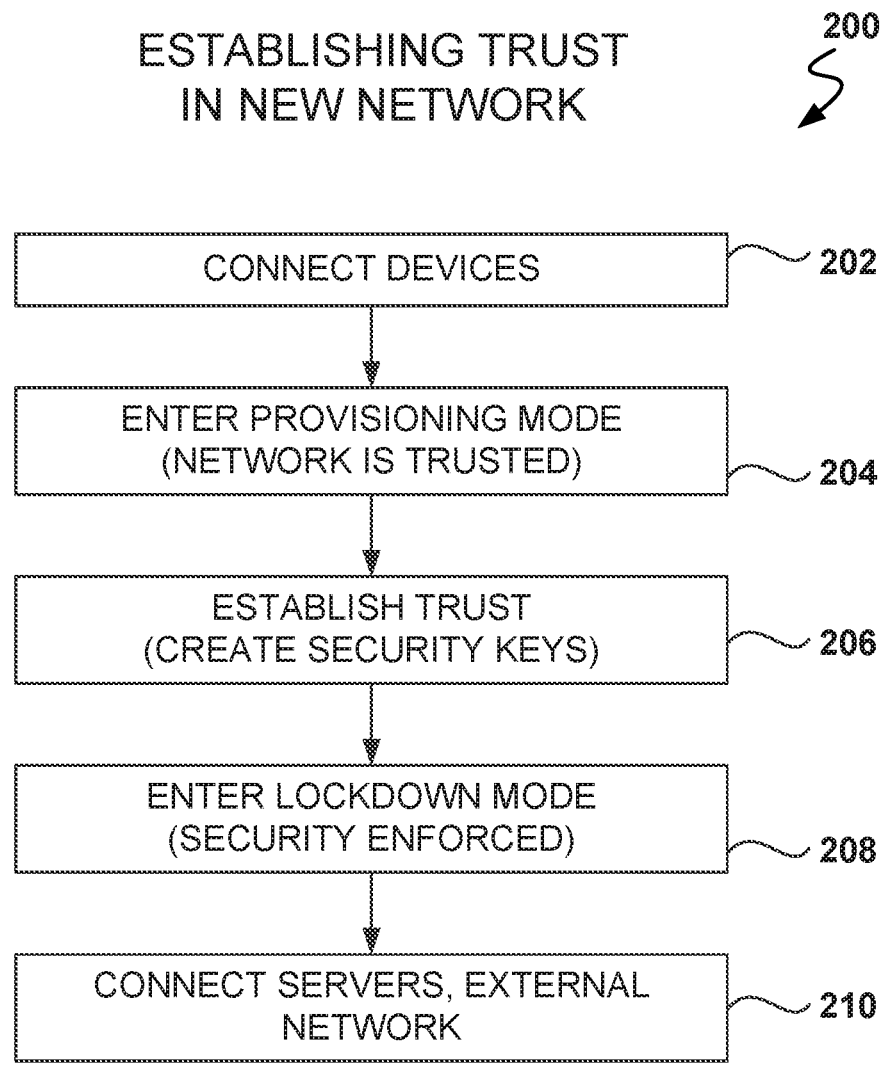
FIG. 2 is a flowchart of a method for establishing trust in a new network, according to some example embodiments.

FIG. 2 is a flowchart illustrating a method 200 for establishing trust in a new network, according to some example embodiments. When building trust on a network, there are two sample scenarios: building a network from scratch and adding a network device to an existing network.

In some example embodiments, building a new network is usually performed on an isolated network, and after all the network equipment has been configured and security implemented, then application servers and other hosts are connected to the network, and the network may also be connected to the Internet. Adding a network device to an existing network is not simple because the network is already secure and actively routing packets. Therefore, it would be dangerous to turn off security just to add a new network device.

Network equipment manufacturers may install security software on the network device at the factory to enable the network device to be securely connected into an existing network. However, some networking software developers may use generic switching devices and it may not be possible, or may be too costly, to install software at the factory. In some example embodiments, the network switches install software from a trusted server when they boot up for the first time, and once the software is installed, the network device performs operations to secure the device.

Returning to FIG. 2, at operation 202, the devices are connected to the network in isolation from the Internet or application servers. In one example embodiment, the network devices have two modes of operation: provisioning mode and lockdown mode. In the provisioning mode, trust among the network participants is assumed. For example, communications may not be encrypted and checks for authenticity are not performed on communications partners. However, in the lockdown mode, security is strictly enforced, including, at least, the use of encrypted communications and security certificates to validate network participants.

From operation 202, the method 200 flows to operation 204 where the one or more network devices enter the provisioning mode, where trust is assumed, e.g., the devices connected to the network are trusted. The provisioning state is used to prepare security enforcement, which is then used in the lockdown mode. In some example embodiments, when a switch is powered up for the first time in the provisioning stage, the switch goes through a series of operations to prepare the switch for the lockdown state.

In operation 206, trust for the lockdown mode is established, which includes creating security keys and security certificates. For example, a certificate authority in the network is able to validate issued certificates for the network devices. More details on how the security keys and the security certificates are obtained are provided below with reference to FIG. 4.

Once all the network devices have been provisioned, the network devices enter lockdown mode in operation 208, which includes enforcing secure communications. Provisioning the switch means that the switch has enough material to prove that the switch is secure (e.g., a security certificate), and that the switch can demand that other network equipment also be secure to exchange communications with the switch.

Transport Layer Security (TLS) is a cryptographic protocol that provides communications security over a computer network. TLS is used in applications such as web browsing, email, e-commerce, instant messaging, and voice over Internet protocol (VoIP), and TLS is used to secure the communications between servers and clients (e.g., web browsers or other client applications and/or devices). The primary goal of the TLS protocol is to provide privacy and data integrity between two communicating computer applications.

When secured by TLS, a connection between a client and a server is private because symmetric cryptography is used to encrypt the data transmitted. The keys for this symmetric encryption are generated uniquely for each connection and are based on a shared secret negotiated at the start of the session. In addition, the identity of the communicating parties can be authenticated using public-key cryptography. This authentication can be made optional, but is generally required for at least one of the parties (typically the server). Further yet, the connection is reliable because each message transmitted includes a message integrity check using a message authentication code to prevent undetected loss or alteration of the data during transmission.

To enforce security, a root of trust is used, such as a certificate authority (CA). The certificate authority (CA), also referred to as a certification authority, is an entity that, among other things, issues digital certificates. A digital certificate certifies the ownership of a public key by the named subject of the certificate. This allows other parties to rely upon signatures made with a private key that corresponds to the certified public key. In this model of trust relationships, the CA is a trusted third party, trusted both by the owner of the certificate and by the party relying upon the certificate. Many public-key infrastructure (PKI) schemes feature CAs.

Thus, in lockdown mode the network is cryptographically secure, and even if there is a malicious attacker on the network, the most the malicious attacker can do is to flood the network with traffic; the malicious attacker would not be able to attack the control plane. At operation 210, the servers are connected to the network (if any), and the network may be connected to other networks, such as the Internet.

Figure 3:
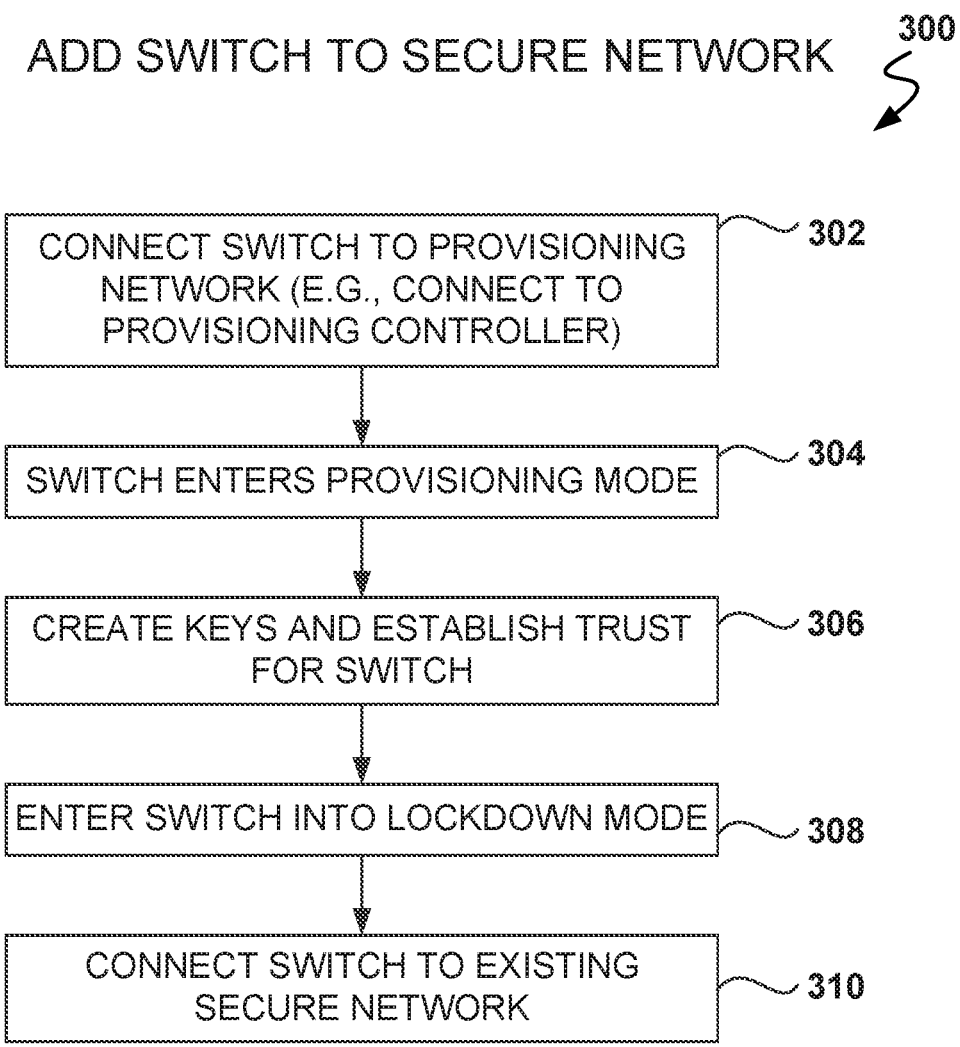
FIG. 3 is a flowchart of a method for adding a switch to a secure network, according to an example embodiment.

FIG. 3 is a flowchart of a method 300 for adding a switch to a secure network, according to an example embodiment. In some example embodiments, to add a new switch to the secure lockdown network, the switch is first connected to a provisioning network, separate from the secure lockdown network. A computer device, referred to as the provisioning controller, is also connected to the provisioning network and is used to configure and secure the new switch. The provisioning controller interacts with the new switch to assist the new switch to become cryptographically secured.

In operation 302, the switch is connected to the provisioning network, and a network connection is established from the switch to the provisioning controller. After the switch is connected, the switch enters provisioning mode in operation 304. It is noted that the secure fabric expects that every switch in the fabric be correctly provisioned; if not, the fabric will not communicate with the switch.

In operation 306, security keys are created for the switch and trust is established by getting a CA certificate. More details are provided below with reference to FIG. 4 on the process to obtain the certificate.

Once the switch is cryptographically secure, in operation 308, the switch is entered into lockdown mode. Once the switch is in lockdown mode, the switch can be connected to the secure fabric (operation 310). For example, the switch is disconnected from the provisioning network and then connected to the secure network. By provisioning the switch in a separate network, the security of the network is not compromised.

In other example embodiments, the whole fabric is placed into provisioning mode, and after all the devices have been correctly provisioned, then the fabric itself goes back to lockdown mode. However, putting the fabric into provisioning mode would mean disconnecting the network from the Internet and probably the servers, so intruders cannot access the provisioning network. However, this would not be a possibility in environments that require a hundred percent network uptime.

Figure 4:
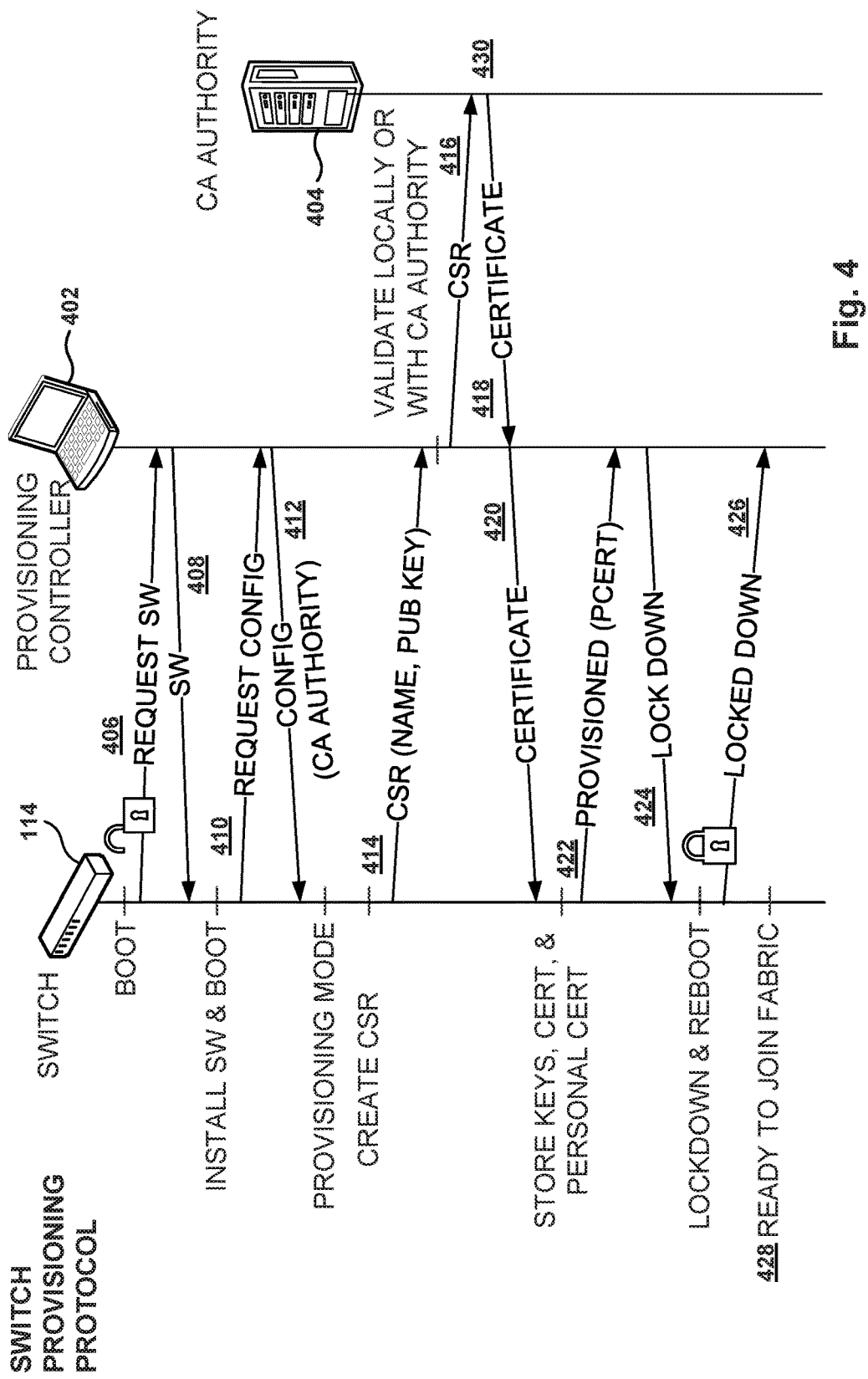
FIG. 4 illustrates a method for provisioning a new switch, according to some example embodiments.

FIG. 4 illustrates a method 400 for provisioning a new switch 114, according to some example embodiments. In some example embodiments, the switch 114 is a generic switch and the first time that the switch 114 boots up, the switch requests software for installation and configuration of the switch. In one example embodiment, the switch 114 executes a program implementing open network install environment (ONIE). ONIE is an open source initiative that defines an open "install environment" for bare metal network switches, and that enables a bare metal network switch ecosystem where end users have a choice among different network operating systems. ONIE defines an open source "install environment" that runs on this management subsystem utilizing facilities in a Linux/BusyBox environment. This environment allows end-users and channel partners to install the target network OS as part of data center provisioning, in the fashion that servers are provisioned. In some example embodiments, the new switch is unlocked and has no cryptographic key preinstalled at the factory.

At operation 406, the switch 114 sends a request for software to the provisioning controller 402. At operation 408, the provisioning controller 402 responds to the request by sending the software to switch 114, which includes the operating system for the switch 114, and a program to perform the provisioning operations described herein. The switch 114 then installs the software and reboots.

In some example embodiments, all the communications between switches 114 are always encrypted (e.g., https), but there is no initial trust yet between the network devices. The switch 114 has the software but the switch 114 does not have a certificate or a way to be secured yet.

Further, the switch 114 may ask the provisioning controller 402 if there are any updates to the software (not shown). If the provisioning controller 402 has a software update, the provisioning controller 402 sends the new software image to the switch 114, which installs it and reboots again. The switch 114 retains the cryptographic provisioning (CA certificate and device key pair/certificate).

At operation 410, the switch 114 requests configuration information and the provisioning controller 402 returns the configuration information for the switch 114 at operation 412. The configuration information includes information notifying the switch 114 that the switch 114 is in the provisioning mode and also an identification of the trusted certificate authority (CA) 404.

Public-key cryptography, or asymmetric cryptography, is a cryptographic system that uses pairs of keys: a public key that may be disseminated widely and a private key which is known only to the owner. There are two basic uses for public-key cryptography: using a public key to authenticate that a message originated with a holder of the paired private key; and encrypting a message with a public key to ensure that only the holder of the paired private key can decrypt the message.

After entering provisioning mode, the switch 114 creates a certificate signing request (CSR). In some example embodiments, the switch also creates a temporary self-signed certificate that is used to enable certain operations requiring the presence of any certificate. This self-signed certificate does not establish any trust and is replaced with the certificate issued by the CA when it becomes available. At this point, the switch 114 needs to be able to certify itself to other switches as the entity that the switch 114 is presenting itself to be. Certification is done with the help of the certificate authority 404. In simple terms, the certificate authority 404 certifies that this switch 114 is who the switch 114 is claiming to be (e.g., "switch 24") and that the corresponding key is truly the switch's private key. The certificate generated by the CA 404 proves the validity of the switch 114 and the private key.

At operation 414, the switch 114 communicates the CSR to the CA 404 requesting that the switch 114 be certified. The CSR is a message sent from an applicant (e.g., switch 114) to a certificate authority (e.g., CA 404) in order to apply for a digital identity certificate. The CSR contains information identifying the applicant (e.g., such as a distinguished name in the case of an X.509 certificate) that is signed with the applicant's private key. The CSR also contains the public key chosen by the applicant. The CSR may be accompanied by other credentials or proofs of identity, as required by the certificate authority. Thus, the switch 114 signs the CSR with the private key of the switch 114 and sends the CSR with its name and its public key to the provisioning controller 402.

Certification may be performed by an internal certificate authority within the provisioning controller 402 or by an external certificate authority, which executes on a separate computing device not connected to the provisioning network. In one example embodiment, the provisioning controller 402 is the CA, and the provisioning controller 402 generates a certificate for the switch 114 and sends the certificate to the switch 114. In this case, the provisioning controller 402 would not require the assistance of the separate CA 404 for generating the certificate.

When an external certificate authority is utilized, as illustrated in the exemplary embodiment of FIG. 4, provisioning controller 402 transfers, at operation 416, the CSR to the CA 404, the CA 404 creates a certificate, and, at operation 418, the CA 404 sends the certificate to provisioning controller 402. In some example embodiments, the provisioning controller 402 may communicate with the CA 404 via an out-of-band communication (e.g., a dial-up connection) channel. In some example embodiments, the provisioning controller 402 may export the CSR to a removable storage device (e.g., a USB drive). In this case, the network administrator transfers the CSR to the CA 404, gets the certificate, and then brings the certificate back to the provisioning controller 402.

In one example embodiment, switch 114 keeps sending the CSR periodically to the provisioning controller 402 and waits until the switch 114 gets the certificate. When provisioning a plurality of switches 114, the provisioning controller 402 can take all the CSR's in a batch to the CA 404 to expedite the process. This is better than having to go from switch 114 to switch 114 and connecting cables to each switch to configure the switches 114.

At operation 430, the CA 404 checks the integrity of the CSR and verifies the name of the switch 114 contained in the CSR. If the operation is successful, the CA 404 generates the certificate for the switch 114, signs the certificate with the CA private key, and sends (operation 418) the certificate to the provisioning controller 402, which, at operation 420, communicates the certificate to the switch 114. Now other switches 114 that trust the CA 404 will also trust the switch 114 because of the certificate that is presented by the switch 114.

The switch 114 stores, in permanent storage, the pair of keys, the CA certificate, and the personal certificate at operation 422. Further, the switch 114 sends a message to the provisional controller 402 indicating that the switch 114 has been provisioned and is ready for lockdown, the message including the certificate, for the switch 114, as proof of its identity.

At operation 424, the provisioning controller 402 sends a lockdown command to the switch 114 and, responsive to receiving the command, the switch 114 reboots in locked down mode. At operation 426, the switch 114 sends a message to provisioning controller 402 indicating that the switch 114 is in lockdown mode. At this point, all communications from the switch 114 will be secure and the switch is ready to join the fabric at operation 428.

At this point, the switch can be placed in an untrusted network because the switch has the cryptographic material to identify itself, and is configured to demand from other devices that they identify themselves and use secure encryption. Once all the switches are configured and in lockdown, the fabric may be placed in lockdown mode. It is noted that to be able to communicate securely, either the network has to be trusted or the devices must have cryptographic trust established among them. In the provisioning mode, the network is trusted so all devices in the network are trusted, and it is assumed that none of the devices in the network could be malicious. Thus, in the provisioning mode, the devices can talk to each other without having established cryptographic trust. In the lockdown mode, the network is untrusted and the devices have to use and enforce the cryptographic trust established through provisioning.

In previous configuration methods, the operator had to connect to the switch, log in, and enter a number of complicated commands to provision the switch. In the example embodiments, the operator connects the switch to the provisioning network and waits for the switch to be provisioned. Further, it is noted that the embodiments presented herein may be applied not only to physical switches, but also to virtual switches.

Figure 5:
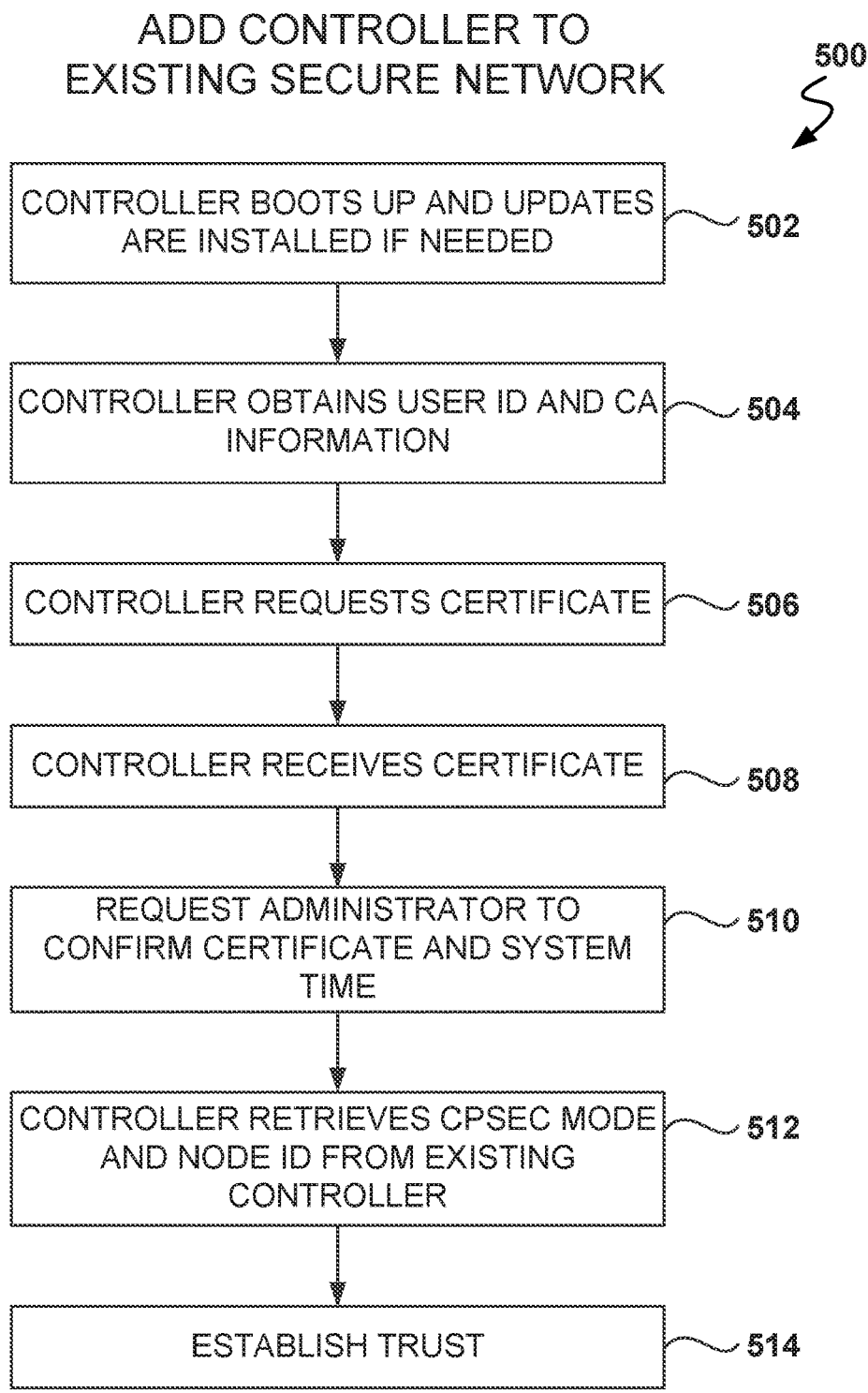
FIG. 5 is a flowchart of a method for adding a controller to an existing secure network, according to some example embodiments.

FIG. 5 is a flowchart of a method 500 for adding a new controller 602 (see FIG. 6) to an existing secure network, according to some example embodiments. Sometimes, there is a need to add the new controller 602 to an existing network (e.g., fabric), and some example embodiments presented herein make it easier to add the new controller 602 to the fabric.

In operation 502, the new controller 602 boots up, and new updates are installed if needed, similar to the process used to configure a new switch 114, as described in FIG. 4. In operation 504, the new controller 602 obtains a user identifier (ID) and CA information for the new controller 602 from the network administrator. In one example embodiment, the administrator provides the user name and password for accessing the existing controller as well as an IP address or a hostname for the existing controller. In some example embodiments, the IP address of the existing controller is auto-discovered using Multicast Domain Name System (MDNS) or any other discovery protocol.

In operation 506, the new controller 602 requests a certificate from the current controller 606 (see FIG. 6), and in operation 508, the new controller 602 receives the certificate from the CA, together with the system time, using an unauthenticated request (e.g., without sending the username and password). At operation 510, the new controller asks the administrator to confirm the certificate and the system time.

At operation 512, the new controller 602 retrieves the CPSEC mode and the node ID from the existing controller. At operation 514, the new controller generates a key pair and a CSR. The new controller then repeatedly sends the CSR to the existing controller until the existing controller passes on the CSR to the CA authority (either internal or external) and waits for the CA authority to sign the CSR. After the CA authority signs the CSR, the new controller retrieves the certificate from the existing controller. This process is similar to the process for the new switch to acquire a certificate. The new controller 602 is now able to communicate securely in the lockdown network.

Figure 6:
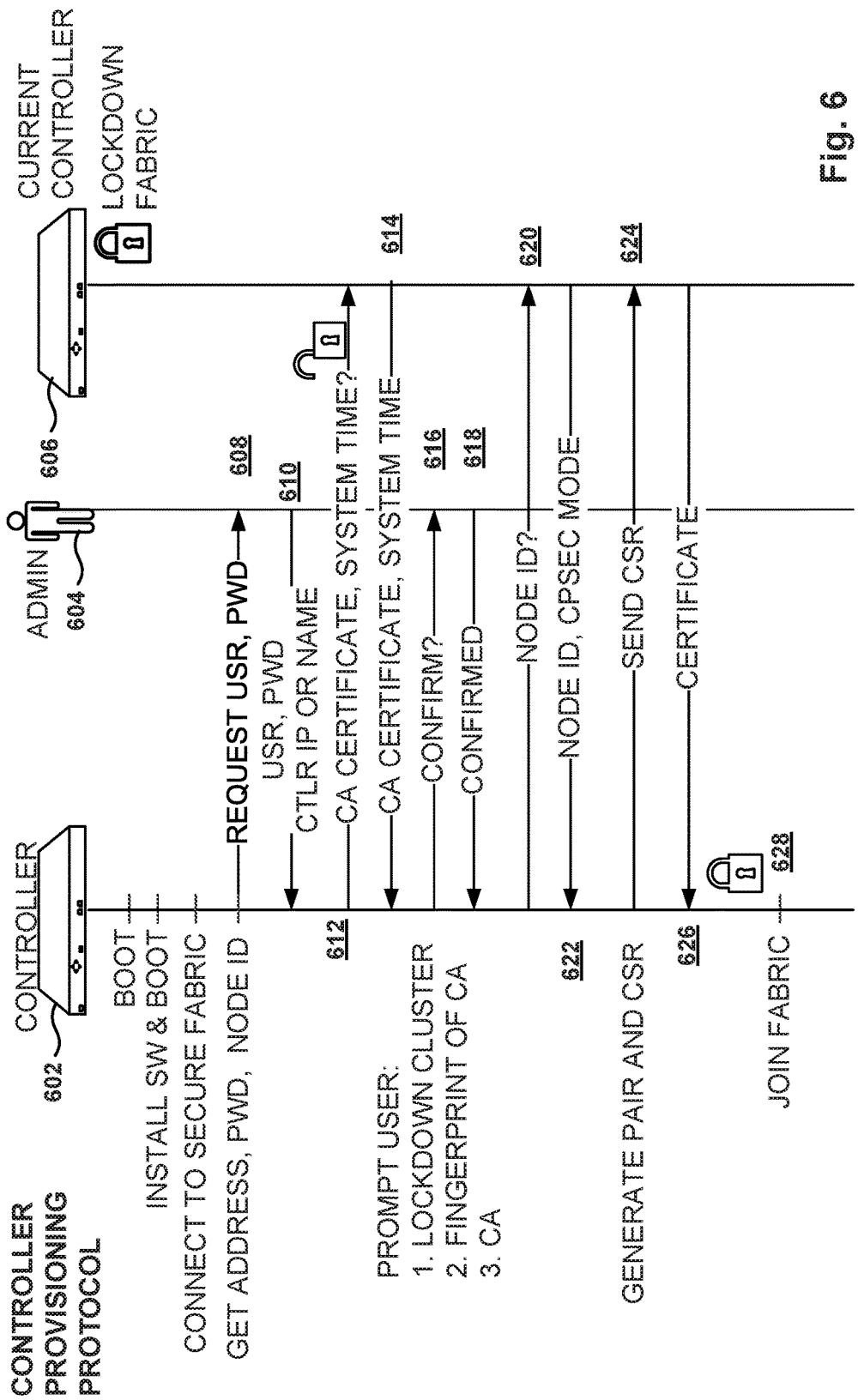
FIG. 6 illustrates a method for provisioning a new controller, according to one example embodiment.

FIG. 6 illustrates a method 600 for provisioning a new controller 602, according to one example embodiment. In one example embodiment, there is a lockdown fabric (e.g., network) already in place with a current controller 606, and the new controller 602 is being added to the fabric. As in the case of the new switch 114 described above, the new controller 602 boots up and installs the software received from a server.

At operation 608, after booting up, the controller 602 requests a user name and password from an administrator 604. The user name and password are used to manage the fabric. For example, the administrator 604 enters (operation 610) the user name and password via a keyboard connected to the new controller 602, or via a secure connection to controller 602.

The new controller 602 has information about the current controller 606, because the information came with the received configuration, or because the administrator 604 provided the information to the controller (e.g., an internet protocol (IP) address or hostname of the current controller 606).

At operation 612, the controller 602 requests a certificate and the system time from the current controller 606. At this point, the request is unauthenticated because the controller 602 has not been provisioned. Controller 606 has not confirmed the authenticity of the new controller 602.

At operation 614, the current controller 606 responds with the certificate and the system time. It is noted that no secrets have been exchanged at this point because trust has not been established yet.

At operation 616, the controller 602 then prompts administrator 604 to validate that the cluster is in "lockdown mode," and to validate the information about the CA, such as the name of the CA or a fingerprint of the identification of the CA, or both. The fingerprint is a value derived from the identity of the CA. At operation 618, the confirmation is received from the administrator. The administrator 604 validates the information about the CA (e.g., the fingerprint), such as by logging into current controller 606 to validate the information about the CA. While this process includes operations by the administrator 604, the administrator 604 does not go from device to device carrying this information. Instead, the administrator 604 may open a console of the existing controller 606 and validate the information. In another example embodiment, the administrator 604 (e.g., operator) may use a dial-up line to connect to the current controller 606 to validate the information.

At operation 620, the new controller 602 requests from the current controller 606 the node ID for the controller, and in operation 622, the current controller sends to the new controller 602 the node ID together with the CPSEC mode.

From this point on, the operations to establish trust are similar to the ones described in FIG. 4. The new controller 602 generates the key pair and the CSR. At operation 624, the new controller 602 sends the CSR to the current controller 606, and the current controller 606 then passes on the CSR to the CA (either internal or external). After the CA signs the CSR, the certificate is imported onto the current controller 606. At operation 626, the new controller 602 then retrieves the certificate and the CPSEC mode from the current controller 606.

At operation 628, the new controller 602 stores the key pair, CA certificate, and personal certificate in permanent storage and reboots into lockdown mode. Controller 602 is now ready to join the secure fabric.

The difference with reference to the operations in FIG. 4 is that there is no trusted provisioning network in the scenario of FIG. 6. Instead, communications are performed on an already secured fabric, which is alive and switching packets.

Although there is administrator involvement to bring up a new controller, the process simplifies what the administrator 604 has to do: just make sure that two fingerprints are the same. The administrator 604 does not have to manually download the certificate and then manually install the certificate on the new controller 602.

Figure 7:
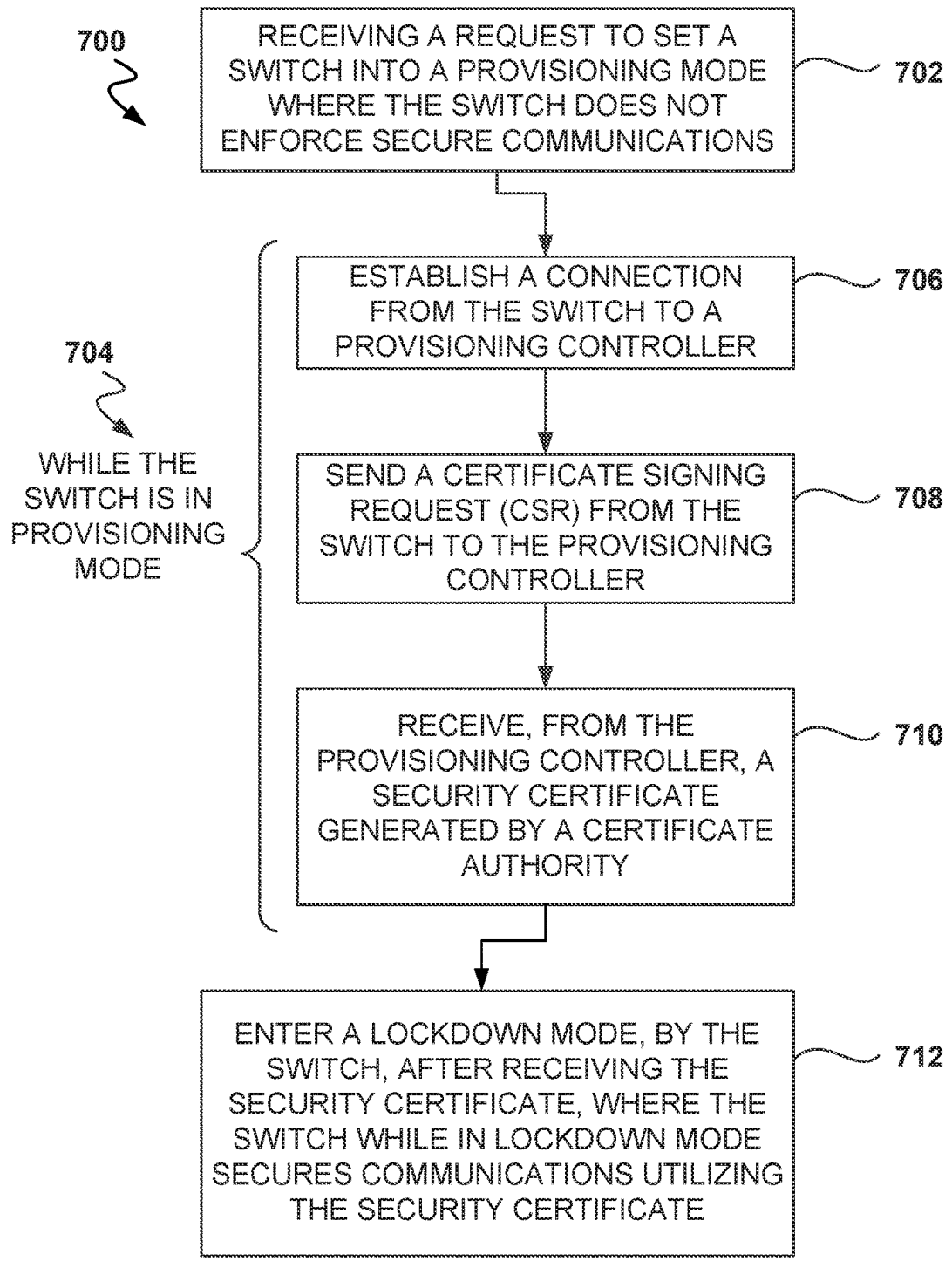
FIG. 7 is a flowchart of a method for provisioning a new switch, according to some example embodiments.

FIG. 7 is a flowchart of a method 700 for provisioning a new switch, according to some example embodiments. While the various operations in the flowcharts of FIGS. 2, 3, 5, and 7 are presented and described sequentially, one of ordinary skill will appreciate that some or all of the operations may be executed in a different order, be combined or omitted, or be executed in parallel.

In operation 702, a switch 114 receives a request to set the switch into a provisioning mode where the switch 114 does not enforce secure communications. While the switch 114 is in provisioning mode 704, the method performs operations 706, 708, and 710. In operation 706, a connection is established from the switch 114 to a provisioning controller 402.

At operation 708, the switch 114 sends a certificate signing request (CSR) to the provisioning controller 402. From operation 708, the method 700 flows to operation 710 for receiving, from the provisioning controller 402, a security certificate generated by a certificate authority.

From operation 710, the method 700 flows to operation 712 where the switch 114 enters a "lockdown mode" after receiving the security certificate. While the switch 114 is in "lockdown mode," the switch 114 secures communications utilizing the security certificate. In one example embodiment, the operations of the method 700 are executed by a processor.

In some example embodiments, setting the switch 114 into the provisioning mode further includes booting up the switch 114, requesting software for the switch 114, installing received software in the switch 114, requesting a configuration from the provisioning controller 402, and receiving the configuration, The configuration includes instructions for setting the "provisioning mode."

In one example embodiment, the method 700 as recited further includes operations for generating a pair of encryption keys by the switch, and for encrypting the CSR with one of the encryption keys before sending the CSR.

In one aspect, the method 700 further includes an operation for storing, after receiving the security certificate, the pair of encryption keys, the security certificate, and a switch certificate in permanent storage of the switch.

In one example embodiment, the certificate authority 404 is part of the provisioning controller 402, where the certificate authority 404 in the provisioning controller 402 generates the security certificate for the switch. In another example embodiment, the provisioning controller 402 has no network connection to the certificate authority 404, and the provisioning controller 402 presents information to an operator for getting the security certificate from the certificate authority 404.

In one example embodiment, the switch 114 is being configured for creating a new network, and the method 700 further includes operations for entering additional switches 114 of the new network into "lockdown mode," and for connecting the new network to an internet after entering all switches 114 into lockdown mode.

In some example embodiments, after entering the "lockdown mode," the switch 114 boots up into "lockdown mode" when the switch 114 is booted up. In one example embodiment, while in "lockdown mode," control communications between trusted switches 114 in a network are encrypted and certified by the certificate authority.

Figure 8:
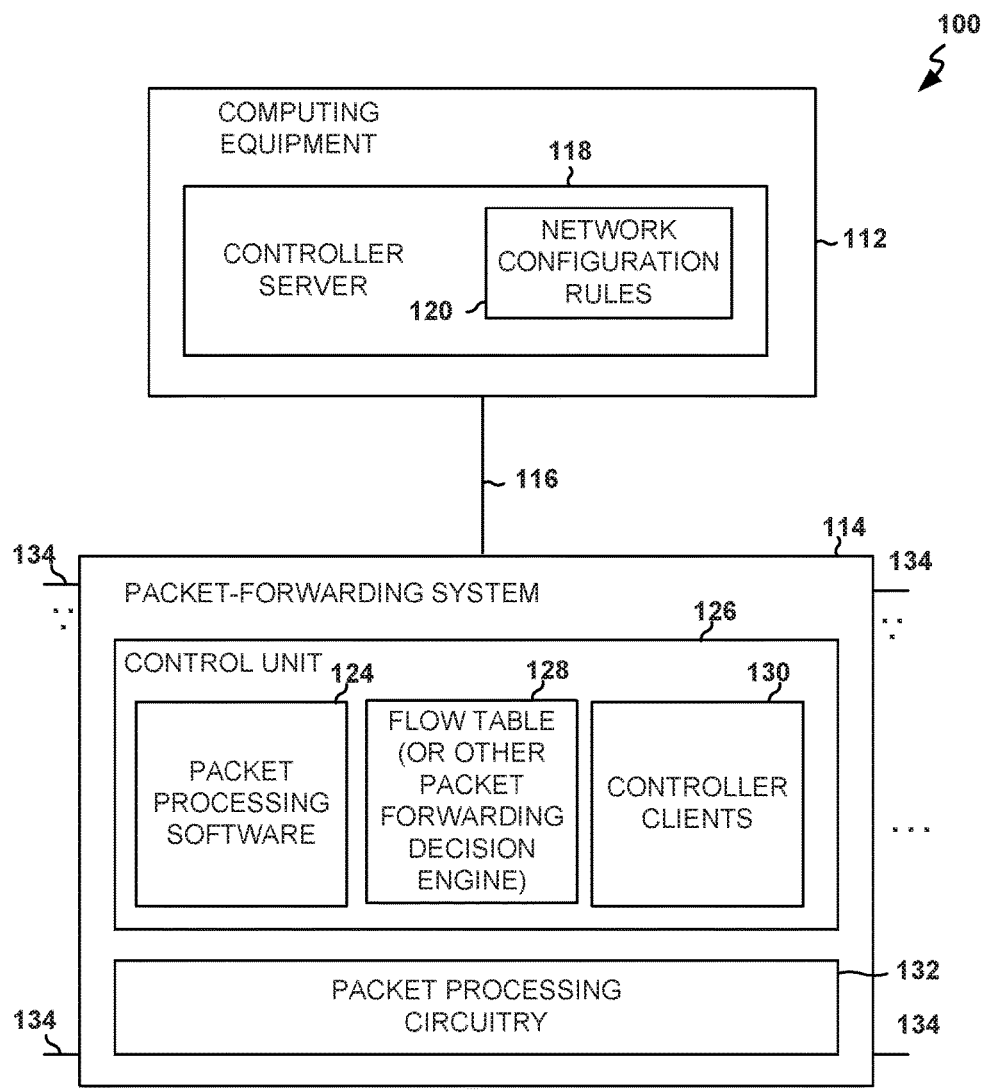
FIG. 8 is a block diagram of a network, according to an example embodiment.

FIG. 8 is a block diagram of illustrating a portion of the network 100 of FIG. 1, according to an example embodiment. The network 100, as shown here in greater detail, provides centralized control and includes one or more controller servers 118 and packet forwarding system 114, also referred to herein as a switch 114, according to an example embodiment. The controller server 118 may be implemented on a stand-alone computer, on a cluster of computers, on a set of computers that are distributed among multiple locations, on hardware that is embedded within a network switch, or on other suitable computing equipment 112. Controller server 118 can run as a single process on a single computer or can be distributed over several hosts for redundancy. The use of a distributed arrangement may help provide the network 100 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are described herein as an example embodiment.

Controller server 118 of FIG. 8 may gather information about the topology of network 100. For example, controller server 118 may send Link Layer Discovery Protocol (LLDP) probe packets through the network 100 to discover the topology of network 100. Controller server 118 may use information on network topology and information on the capabilities of network equipment to determine appropriate paths for packets flowing through the network 100. Once appropriate paths have been identified, controller server 118 may send corresponding setting data to the hardware in network 100 to ensure that packets flow through the network 100 as desired. Network configuration operations such as these may be performed during system setup operations, continuously in the background, or in response to the appearance of newly transmitted data packets (i.e., packets for which a preexisting path has not been established).

Controller server 118 may be used to implement network configuration rules 120. Network configuration rules 120 may specify which services are available to various network entities. As an example, network configuration rules 120 may specify which users (or type of users) in network 100 may access a particular server. As another example, network configuration rules 120 may include service insertion policies identifying network traffic and services that are to be performed on the identified network traffic. Network configuration rules 120 may, for example, be maintained in a database at computing equipment 112.

Controller server 118 and controller clients 130 at respective network switches 114 (e.g., packet forwarding systems) may use network protocol stacks to communicate over network links 116.

Each packet forwarding system 114 may have input-output ports 134 (sometimes referred to as network switch interfaces). Cables may be used to connect equipment to input-output ports 134. For example, end hosts, such as personal computers, web servers, and other computing equipment, may be coupled to ports 134. Ports 134 may also be used to interconnect packet-forwarding systems 114.

Packet processing circuitry 132 may be used in forwarding packets between ports 134 and may be used in performing other suitable actions on incoming packets. In some example embodiments, packet processing circuitry 132 may be implemented using one or more integrated circuits such as dedicated high-speed switch circuits and may serve as a hardware data path. If desired, packet-processing software 124, that is running on control unit 126 may be used in implementing a software data path.

Control unit 126 may include processing and memory circuits (e.g., one or more microprocessors, memory chips, and other control circuitry) for storing and running control software. For example, control unit 126 may store and run software such as packet-processing software 124, may store flow table 128, and may be used to support the operation of controller clients 130.

Controller clients 130 and controller server 118 may be compliant with a network switch protocol such as the OpenFlow protocol (see, e.g., OpenFlow Switch Specification version 1.0.0, 1.3.1, or other versions of the OpenFlow protocol). One or more clients among controller clients 130 may also be compliant with other protocols (e.g., the Simple Network Management Protocol). Using the OpenFlow protocol or other suitable protocols, controller server 118 may provide controller clients 130 with data that determines how switch 114 is to process incoming packets from input-output ports 134.

With one suitable arrangement, flow table data from controller server 118 may be stored in a flow table such as flow table 128. The entries of flow table 128 may be used in configuring packet-forwarding system 114 (e.g., the functions of packet processing circuitry 132 and/or packet processing software 124). In a typical scenario, flow table 128 serves as cache storage for flow table entries and a corresponding version of these flow table entries is embedded within the settings maintained by the circuitry of packet processing circuitry 132. This is, however, merely illustrative. Flow table 128 may serve as the exclusive storage for flow table entries in packet-forwarding system 114 or may be omitted in favor of flow table storage resources within packet processing circuitry 132. In general, flow table entries may be stored using any suitable data structures (e.g., one or more tables, lists, etc.). For clarity, the data of flow table 128 (whether maintained in a database in control unit 126 or embedded within the configuration of packet processing circuitry 132) is referred to herein as forming flow table entries (e.g., rows in flow table 128).

The example of flow tables 128, storing data that determines how switch 114 is to process incoming packets, is merely illustrative. If desired, any packet-forwarding decision engine may be used in place of or in addition to flow tables 128 to assist packet-forwarding systems 114 to make decisions about how to forward network packets. As an example, packet-forwarding decision engines may direct packet-forwarding systems 114 to forward network packets to predetermined ports based on attributes of the network packets (e.g., based on network protocol headers).

Any desired packet-forwarding system may be provided with controller clients 130 that communicate with, and are controlled by, a controller server 118. For example, packet-forwarding system 114 may be implemented using a general purpose processing platform that runs control software and that omits packet processing circuitry 132. As another example, packet-forwarding system 114 may be implemented using control circuitry that is coupled to one or more high-speed switching integrated circuits ("switch ICs"). As yet another example, packet-forwarding system 114 may be implemented as a line card in a rack-based system having multiple line cards, each with its own packet processing circuitry. The controller server 118 may, if desired, be implemented on one or more line cards in the rack-based system, in another rack-based system, or on other computing equipment that is coupled to the network 100.

Figure 9:
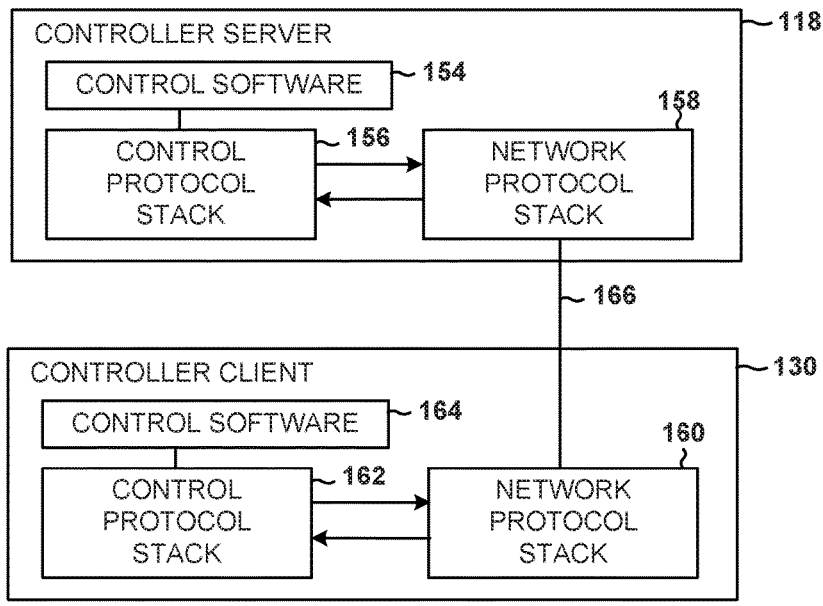
FIG. 9 is a block diagram of a controller server and controller client, according to an example embodiment.

FIG. 9 is a block diagram of a controller server 118 and controller client 130, according to an embodiment. The controller server 118 and the controller client 130 may communicate over network path 166 using network protocol stacks such as network protocol stack 158 and network protocol stack 160. The network protocol stacks 158 and 160 may be, for example Linux™ TCP/IP stacks or the TCP/IP stack in the VxWorks™ operating system (as examples). The network path 166 may be, for example, a connection between switch 114 and external equipment (e.g., network link 116 of FIG. 8) or may be a backbone path in a rack-based system. Arrangements in which path 166 is a network path such as network link 116 are sometimes described herein as an example.

Control protocol stack 156 serves as an interface between network protocol stack 158 and control software 154. Control protocol stack 162 serves as an interface between network protocol stack 160 and control software 164. During operation, when controller server 118 is communicating with controller client 130, control protocol stacks 156 and 162 generate and parse control protocol messages (e.g., control messages to activate a port or to install a particular flow table entry into flow table 128). By using arrangements of the type shown in FIG. 9, a network connection is formed over the network path 166 between controller server 118 and controller client 130. Controller server 118 and controller client 130 can communicate using a Transmission Control Protocol (TCP) or User Datagram Protocol (UDP) over Internet Protocol (IP) network connection. Examples of control protocols that may be used when communicating between controller server 118 and controller clients 130 over the network connection include SNMP and OpenFlow protocol stack version 1.0.0 (as examples).

Flow table 128 contains flow table entries (e.g., rows in the table) that have multiple fields (sometimes referred to as header fields). The fields in a packet that has been received by switch 114 can be compared to the fields in the flow table 128. Each flow table entry may have associated actions. When there is a match between the fields in a packet and the fields in a flow table entry, the corresponding action for that flow table entry may be taken.

Figure 10:
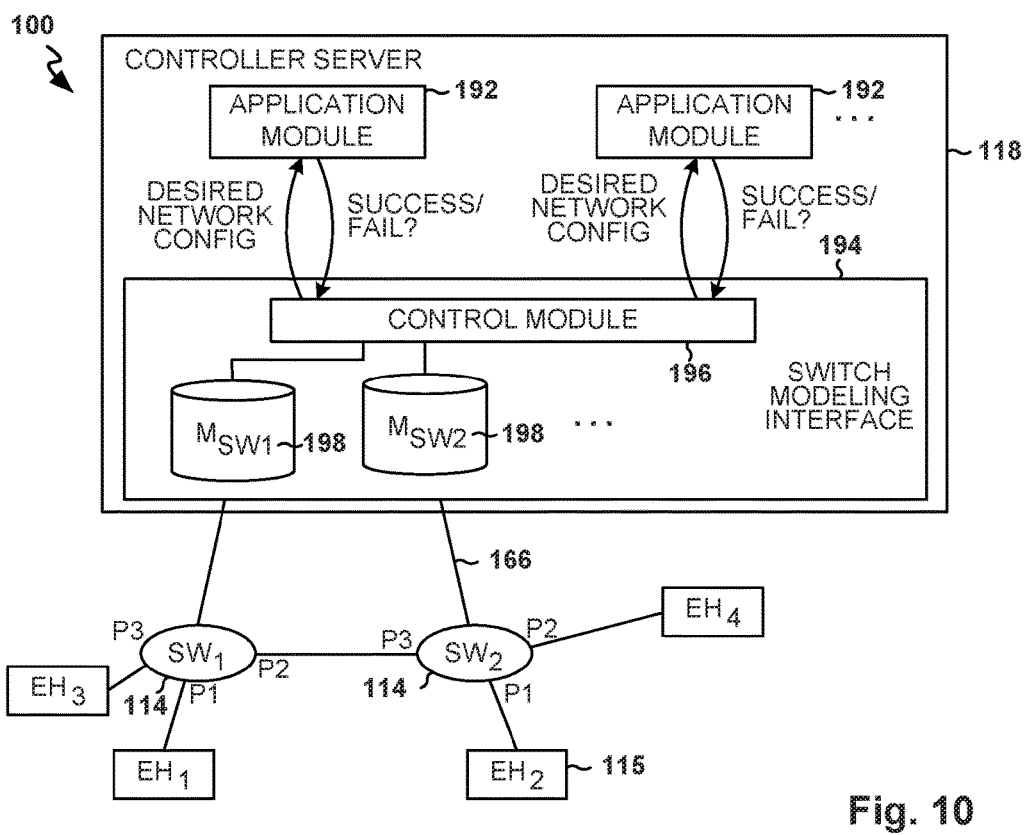
FIG. 10 is a block diagram illustrating the network, according to an example embodiment.

FIG. 10 is a block diagram illustrating a network 100, according to an embodiment. The network 100 is utilized to exemplify a configuration of a multi-vendor network, according to an example embodiment. The network 100 includes switches 114 that may be controlled by the controller server 118. The controller server 118 may be a single device or a distributed controller implemented across multiple computing devices. As shown in FIG. 10, network 100 may include switches SW1 and SW2 114, according to an embodiment. The controller server 118 may be coupled to the switches 114 of network 100 via control paths 166, and control the switches 114 using control paths 166. The switches 114 may include switch ports that are coupled to end hosts or to other switches. In the example of FIG. 10, end hosts EH1 and EH3 115 are coupled to respective ports P1 and P3 of switch SW1 114, end hosts EH2 and EH4 115 are coupled to respective ports P1 and P2 of switch SW2 114, and switches SW1 and SW2 114 are coupled via port P2 of switch SW1 114 and port P3 of switch SW2 114.

Controller server 118 may include one or more application modules 192 that control the operations of switches in a network. For example, a first application module 192 may organize switches into virtual switches formed from groups of end hosts or ports on the switches. In this scenario, the first application module 192 may control underlying switches SW1 and SW2 114 of the network 100 in enforcing network policy and packet forwarding at the virtual switch level (e.g., the network policies may be defined for virtual switches and not the underlying switches). As another example, a second application module 192 may handle network-monitoring functions such as analyzing network traffic to generate network traffic reports. The application modules 192 may generate and provide desired network configurations (e.g., for all or part of the network 100) to switch modeling interface 194. Switch modeling interface 194 may use switch models 198 in implementing the desired network configurations and may indicate to the application modules 192 whether the implementation is successful or has failed.

Modules 192 may be implemented at controller server 118 as software on general-purpose, or as application-specific computing equipment, or as dedicated hardware. For example, modules 192 may be implemented as software modules on shared computing equipment. As another example, modules 192 may be implemented on different computing equipment in a distributed controller arrangement.

Application modules 192 may control switches based on network topology information maintained at the application modules or maintained by other modules of controller server 118. However, there may be hundreds, thousands, or more switches in a network. It can be challenging for application modules 192 to ensure that control messages sent to the switches of a network are successfully received or executed by the switches. In addition, multiple application modules 192 may be implemented at a controller server 118 and potentially conflict with each other. Considering a scenario in which a switch fails to implement a flow table entry received from controller server 118, the state of the switch may not match the expected state and subsequent flow table entries provided by the controller server 118 may produce an undesired network configuration.

Controller server 118 may be provided with a switch modeling interface module (not shown) that handles communications with the switches and maintenance of switch states. The switch modeling interface module may help to ensure that application modules 192 are synchronized with the switches of the network. Switch modeling interface 194 may be utilized to implement models 198 that represent each switch in the network 100. For example, switch model MSW1 may represent switch SW1 114, whereas switch model MSW2 may represent switch SW2 114. Switch models MSW1 and MSW2 may maintain information on the current state of respective switches SW1 and SW2 114. For example, switch model MSW1 may maintain information identifying the forwarding rules or policies that are implemented at switch SW1 114, whereas switch model MSW2 may identify the state of switch SW2 114.

Switch models 198 may be controlled by control module 196. Control module 196 may control switch models 198 and issue control messages to switches of the network 100 in fulfilling network control requests from application modules 192. Switch models 198 may be implemented as a data construct such as a set of tables.

Figure 11:
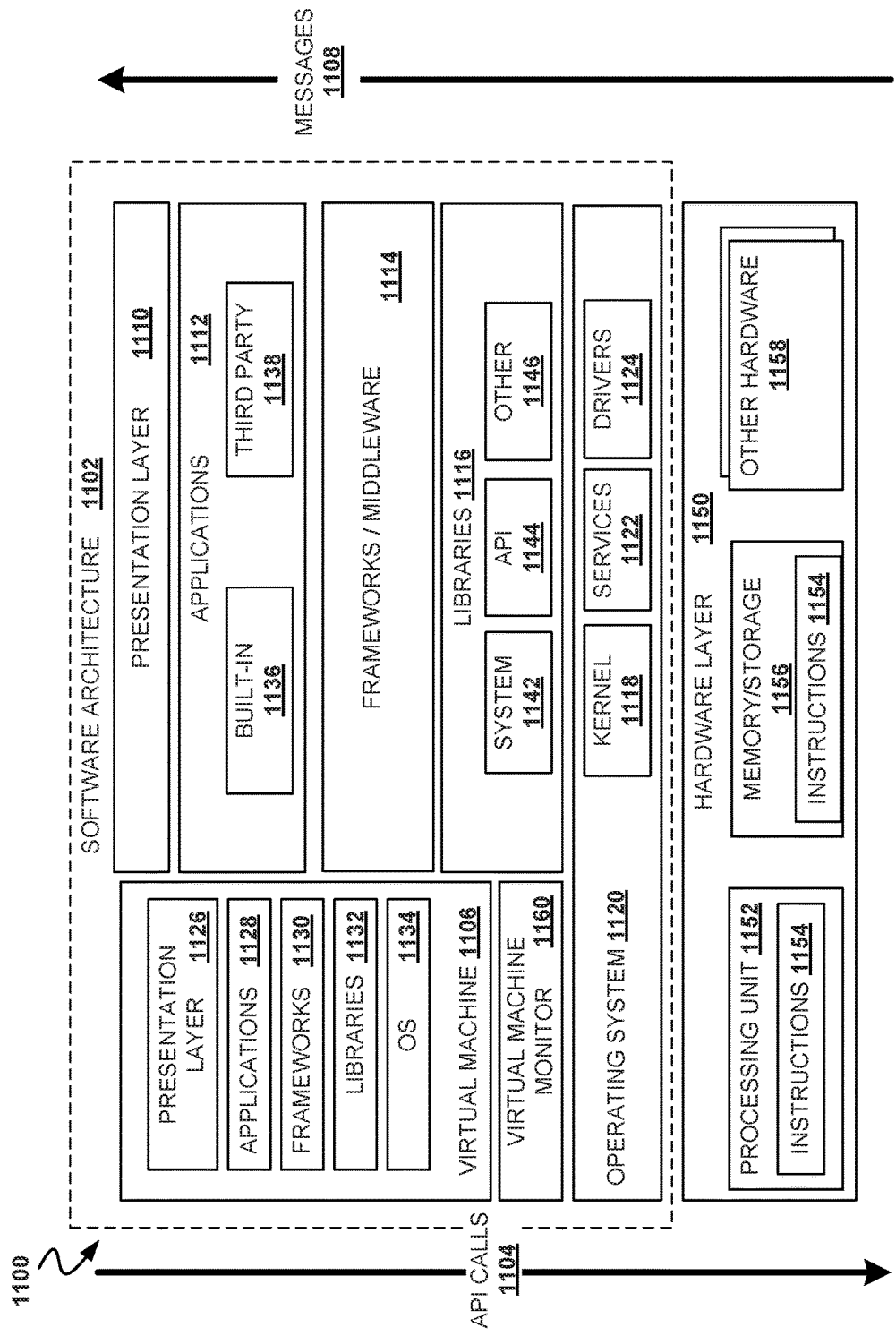
FIG. 11 is a block diagram illustrating an example of a software architecture that may be installed on a machine, according to some example embodiments.

FIG. 11 is a block diagram 1100 illustrating a representative software architecture 1102, which may be used in conjunction with various hardware architectures herein described. FIG. 11 is merely a non-limiting example of a software architecture 1102 and it will be appreciated that many other architectures may be implemented to facilitate the functionality described herein. The software architecture 1102 may be executing on hardware such as machine 1200 of FIG. 12 that includes, among other things, processors 1204, memory/storage 1206, and I/O components 1218. A representative hardware layer 1150 is illustrated and can represent, for example, the machine 1200 of FIG. 12. The representative hardware layer 1150 comprises one or more processing units 1152 having associated executable instructions 1154. Executable instructions 1154 represent the executable instructions of the software architecture 1102, including implementation of the methods, modules and so forth of FIGS. 1-10. Hardware layer 1150 also includes memory and/or storage modules 1156, which also have executable instructions 1154. Hardware layer 1150 may also comprise other hardware 1158 which represents any other hardware of the hardware layer 1150, such as the other hardware illustrated as part of machine 1200.

In the example architecture of FIG. 11, the software architecture 1102 may be conceptualized as a stack of layers where each layer provides particular functionality. For example, the software architecture 1102 may include layers such as an operating system 1120, libraries 1116, frameworks/middleware 1114, applications 1112 and presentation layer 1110. Operationally, the applications 1112 and/or other components within the layers may invoke application programming interface (API) calls 1104 through the software stack and receive a response, returned values, and so forth illustrated as messages 1108 in response to the API calls 1104. The layers illustrated are representative in nature and not all software architectures have all layers. For example, some mobile or special purpose operating systems may not provide a frameworks/middleware layer 1114, while others may provide such a layer. Other software architectures may include additional or different layers.

The operating system 1120 may manage hardware resources and provide common services. The operating system 1120 may include, for example, a kernel 1118, services 1122, and drivers 1124. The kernel 1118 may act as an abstraction layer between the hardware and the other software layers. For example, the kernel 1118 may be responsible for memory management, processor management (e.g., scheduling), component management, networking, security settings, and so on. The services 1122 may provide other common services for the other software layers. The drivers 1124 may be responsible for controlling or interfacing with the underlying hardware. For instance, the drivers 1124 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1116 may provide a common infrastructure that may be utilized by the applications 1112 and/or other components and/or layers. The libraries 1116 typically provide functionality that allows other software modules to perform tasks in an easier fashion than to interface directly with the underlying operating system 1120 functionality (e.g., kernel 1118, services 1122 and/or drivers 1124). The libraries 1116 may include system libraries 1142 (e.g., C standard library) that may provide functions such as memory allocation functions, string manipulation functions, mathematic functions, and the like. In addition, the libraries 1116 may include API libraries 1144 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1146 to provide many other APIs to the applications 1112 and other software components/modules.

The frameworks 1114 (also sometimes referred to as middleware) may provide a higher-level common infrastructure that may be utilized by the applications 1112 and/or other software components/modules. For example, the frameworks 1114 may provide various graphic user interface (GUI) functions, high-level resource management, high-level location services, and so forth. The frameworks 1114 may provide a broad spectrum of other APIs that may be utilized by the applications 1112 and/or other software components/modules, some of which may be specific to a particular operating system or platform.

The applications 1112 includes built-in applications 1136 and/or third party applications 1138. Examples of representative built-in applications 1136 may include, but are not limited to, a contacts application, a browser application, a book reader application, a location application, a media application, a messaging application, and/or a game application. Third party applications 1138 may include any of the built in applications 1136 as well as a broad assortment of other applications. In a specific example, the third party application 1138 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 1138 may invoke the API calls 1104 provided by the mobile operating system such as operating system 1120 to facilitate functionality described herein.

The applications 1112 may utilize built in operating system functions (e.g., kernel 1118, services 1122 and/or drivers 1124), libraries (e.g., system libraries 1142, API libraries 1144, and other libraries 1146), frameworks/middleware 1114 to create user interfaces to interact with users of the system. Alternatively, or additionally, in some systems interactions with a user may occur through a presentation layer, such as presentation layer 1110. In these systems, the application/module "logic" can be separated from the aspects of the application/module that interact with a user.

Some software architectures utilize virtual machines. In the example of FIG. 11, this is illustrated by virtual machine 1106. A virtual machine creates a software environment where applications/modules can execute as if they were executing on a hardware machine (such as the machine 1200 of FIG. 12, for example). A virtual machine 1106 is hosted by a host operating system (operating system 1120 in FIG. 11) and typically, although not always, has a virtual machine monitor 1160, which manages the operation of the virtual machine 1106 as well as the interface with the host operating system (i.e., operating system 1120). A software architecture executes within the virtual machine 1106 such as an operating system 1134, libraries 1132, frameworks/middleware 1130, applications 1128 and/or presentation layer 1126. These layers of software architecture executing within the virtual machine 1106 can be the same as corresponding layers previously described or may be different.

Figure 12:
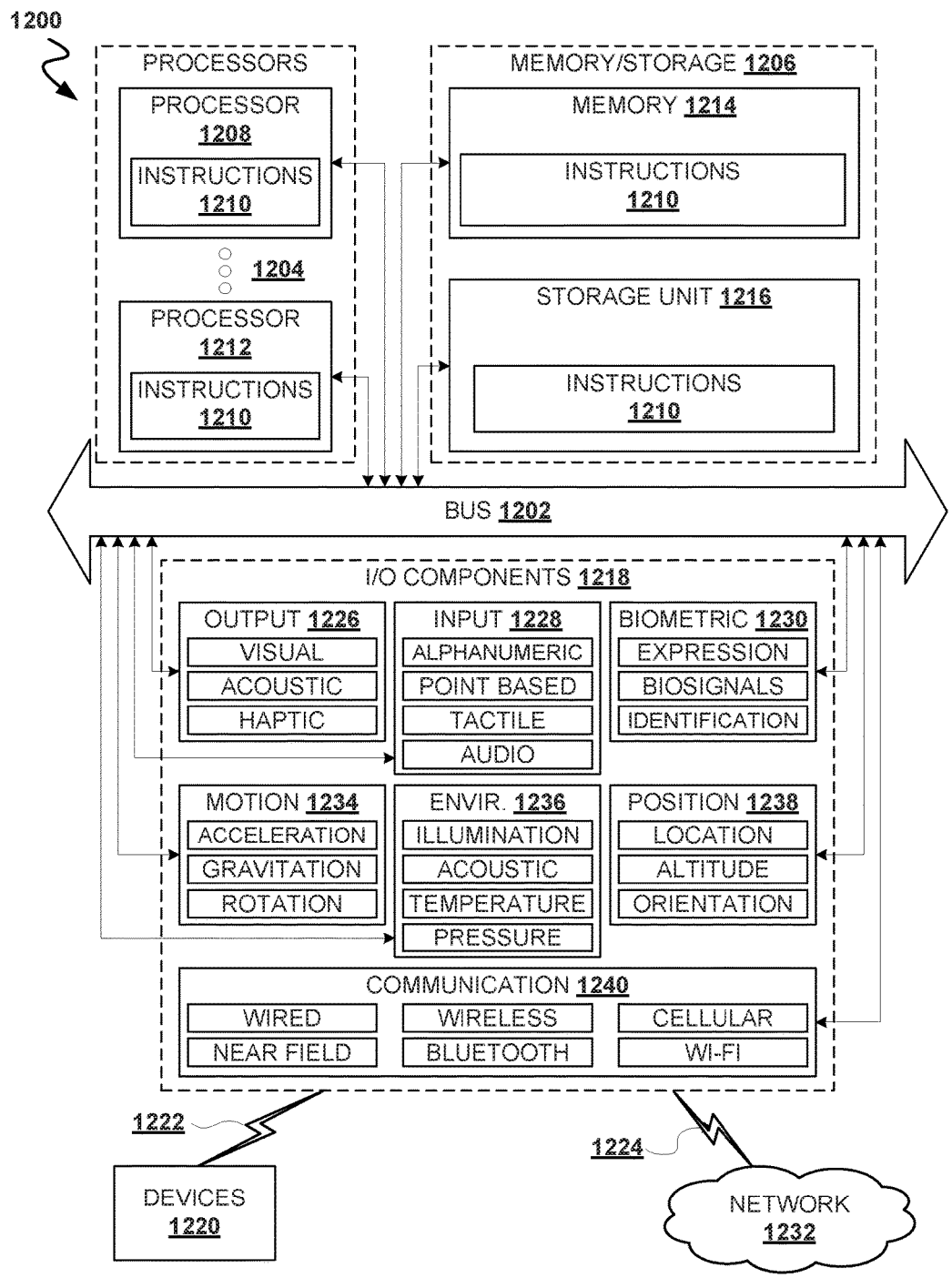
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. For example the instructions 1210 may cause the machine 1200 to execute the flow diagrams of FIGS. 1-10. The instructions 1210 transform the general, non-programmed machine 1200 into a particular machine 1200 programmed to carry out the described and illustrated functions in the manner described.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines 1200 that individually or jointly execute the instructions 1210 to perform any one or more of the methodologies discussed herein.

The machine 1200 may include processors 1204, memory/storage 1206, and I/O components 1218, which may be configured to communicate with each other such as via a bus 1202. In an example embodiment, the processors 1204 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1208 and processor 1212 that may execute instructions 1210. The term "processor" is intended to include multi-core processor that may comprise two or more independent processors (sometimes referred to as "cores") that may execute instructions contemporaneously. Although FIG. 12 shows multiple processors 1204, the machine 1200 may include a single processor with a single core, a single processor with multiple cores (e.g., a multi-core process), multiple processors with a single core, multiple processors with multiples cores, or any combination thereof.

The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1210. The term "machine-readable medium" shall also be taken to include any medium, or combination of multiple media, that is capable of storing instructions (e.g., instructions 1210) for execution by a machine (e.g., machine 1200), such that the instructions, when executed by one or more processors of the machine 1200 (e.g., processors 1204), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1218 may include a wide variety of components to receive input, provide output, produce output, transmit information, exchange information, capture measurements, and so on. The specific I/O components 1218 that are included in a particular machine will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environmental components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1224 and coupling 1222 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geo-location, location via Wi-Fi® signal triangulation, location via detecting an NFC beacon signal that may indicate a particular location, and so forth.

In various example embodiments, one or more portions of the network 1232 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1232 or a portion of the network 1232 may include a wireless or cellular network and the coupling 1224 may be a Code Division Multiple Access (CDMA) connection, a Global System for Mobile communications (GSM) connection, or other type of cellular or wireless coupling. In this example, the coupling 1224 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1210 may be transmitted or received over the network 1232 using a transmission medium via a network interface device (e.g., a network interface component included in the communication components 1240) and utilizing any one of a number of well-known transfer protocols (e.g., hypertext transfer protocol (HTTP)). Similarly, the instructions 1210 may be transmitted or received using a transmission medium via the coupling 1222 (e.g., a peer-to-peer coupling) to devices 1220. The term "transmission medium" shall be taken to include any intangible medium that is capable of storing, encoding, or carrying instructions 1210 for execution by the machine 1200, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving a request, by a switch, to set the switch into a provisioning mode where the switch does not enforce secure communications, wherein in the provisioning mode devices in a network are trusted and the devices communicate with each other without establishing cryptographic trust;
   while the switch is in the provisioning mode:
      establishing a connection from the switch to a provisioning controller;
      sending a certificate signing request (CSR) from the switch to the provisioning controller; and
      after sending the CSR to the provisioning controller, receiving by the switch, from the provisioning controller, a security certificate generated by a certificate authority; and
   entering a lockdown mode, by the switch, after receiving the security certificate, the switch being in the lockdown mode secures communications utilizing the security certificate, wherein while in the lockdown mode control communications between the switch and other switches in the network are encrypted and certified by the certificate authority, wherein in the lockdown mode the switch demands that other switches exchange communications with the switch using encrypted messages, the operations of the method being executed by a processor.

2. The method as recited in claim 1, wherein the setting the switch into the provisioning mode further includes:
   booting up the switch;
   requesting software for the switch;
   installing received software in the switch;
   requesting a configuration from the provisioning controller; and
   receiving the configuration, wherein the configuration includes instructions for setting the provisioning mode.

3. The method as recited in claim 1, further including:
   generating a pair of encryption keys by the switch; and
   encrypting the CSR with one of the encryption keys before sending the CSR.

4. The method as recited in claim 3, further including:
   storing, after receiving the security certificate, the pair of encryption keys, the security certificate, and a switch certificate in permanent storage of the switch.

5. The method as recited in claim 1, wherein the certificate authority is part of the provisioning controller, wherein the certificate authority in the provisioning controller generates the security certificate for the switch.

6. The method as recited in claim 1, wherein the provisioning controller has no network connection to the certificate authority, wherein the provisioning controller presents information to an operator for getting the security certificate from the certificate authority.

7. The method as recited in claim 1, wherein the switch is being configured for creating a new network, wherein the method further includes:
   entering additional switches of the new network into the lockdown mode; and
   connecting the new network to an internet after entering all switches into the lockdown mode.

8. The method as recited in claim 1, wherein after entering the lockdown mode the switch boots up into the lockdown mode when the switch is booted up.

9. A switch comprising:
packet processing circuitry for switching packets;
a memory including instructions; and
one or more computer processors, wherein the instructions, when executed by the one or more computer processors, cause the one or more computer processors to perform operations comprising:
 receiving a request, by the switch, to set the switch into a provisioning mode where the switch does not enforce secure communications, wherein in the provisioning mode devices in a network are trusted and the devices communicate with each other without establishing cryptographic trust;
 while the switch is in the provisioning mode:
  establishing a connection from the switch to a provisioning controller;
  sending a certificate signing request (CSR) from the switch to the provisioning controller; and
  receiving, from the provisioning controller, a security certificate generated by a certificate authority; and
 entering a lockdown mode, by the switch, after receiving the security certificate, the switch while in the lockdown mode secures communications utilizing the security certificate, wherein while in the lockdown mode control communications between the switch and other switches in the network are encrypted and certified by the certificate authority, wherein in the lockdown mode the switch demands that other switches exchange communications with the switch using encrypted messages.

10. The switch as recited in claim 9, wherein the setting the switch into the provisioning mode further includes:
 booting up the switch;
 requesting software for the switch;
 installing received software in the switch;
 requesting a configuration from the provisioning controller; and
 receiving the configuration, wherein the configuration includes instructions for setting the provisioning mode.

11. The switch as recited in claim 9, wherein the one or more computer processors further perform operations including:
 generating a pair of encryption keys by the switch;
 encrypting the CSR with one of the encryption keys before sending the CSR; and
 storing, after receiving the security certificate, the pair of encryption keys, the security certificate, and a switch certificate in permanent storage of the switch.

12. The switch as recited in claim 9, wherein the certificate authority is part of the provisioning controller, wherein the certificate authority in the provisioning controller generates the security certificate for the switch.

13. The switch as recited in claim 9, wherein the provisioning controller has no network connection to the certificate authority, wherein the provisioning controller presents information to an operator for getting the security certificate from the certificate authority.

14. A non-transitory machine-readable medium including a set of instructions that, when executed by a machine, causes the machine to perform a set of operations including:
 receiving a request, by a switch, to set the switch into a provisioning mode where the switch does not enforce secure communications, wherein in the provisioning mode devices in a network are trusted and the devices communicate with each other without establishing cryptographic trust;
 while the switch is in the provisioning mode:
  establishing a connection from the switch to a provisioning controller;
  sending a certificate signing request (CSR) from the switch to the provisioning controller; and
  receiving by the switch, from the provisioning controller, a security certificate generated by a certificate authority; and
 entering a lockdown mode, by the switch, after receiving the security certificate, wherein the switch while in the lockdown mode secures communications utilizing the security certificate, wherein while in the lockdown mode control communications between the switch and other switches in the network are encrypted and certified by the certificate authority, wherein in the lockdown mode the switch demands that other switches exchange communications with the switch using encrypted messages.

15. The machine-readable medium as recited in claim 14, wherein the setting the switch into the provisioning mode further includes:
 booting up the switch;
 requesting software for the switch;
 installing received software in the switch;
 requesting a configuration from the provisioning controller; and
 receiving the configuration, wherein the configuration includes instructions for setting the provisioning mode.

16. The machine-readable medium as recited in claim 14, wherein the machine further perform operations including:
 generating a pair of encryption keys by the switch;
 encrypting the CSR with one of the encryption keys before sending the CSR; and
 storing, after receiving the security certificate, the pair of encryption keys, the security certificate, and a switch certificate in permanent storage of the switch.

17. The machine-readable medium as recited in claim 14, wherein the provisioning controller has no network connection to the certificate authority, wherein the provisioning controller presents information to an operator for getting the security certificate from the certificate authority.

18. The machine-readable medium as recited in claim 14, wherein after entering the lockdown mode the switch boots up into the lockdown mode when the switch is booted up.

19. The machine-readable medium as recited in claim 14, wherein, while in the lockdown mode, control communications between trusted switches in a network are encrypted and certified by the certificate authority.

20. A method comprising:
 obtaining, by a new controller to be added to a network in lockdown mode, user identification and certificate authority (CA) identification;
 requesting, by the new controller, a first security certificate from an existing controller;
 receiving, by the new controller, the first security certificate from the existing controller, the existing controller generating the first security certificate for the new controller;
 receiving, by the new controller, from an administrator confirmation of the first security certificate;
 receiving, by the new controller, from the existing controller a node identifier for the new controller and control information;
 generating, by the new controller, a certificate signing request (CSR);
 sending the CSR from the new controller to the existing controller; and receiving, by the new controller, a second controller security certificate associated with the CSR the second controller security certificate being for secure communications between the n controller and other devices certified by the CA.

\* \* \* \* \*